350-316.  SR
9-25-73  XR  3,761,718

United States Patent [19]
Kohn et al.

[11] 3,761,718
[45] Sept. 25, 1973

[54] DETECTOR APPARATUS USING SEMICONDUCTOR LAMINAE

[75] Inventors: Alan N. Kohn, Brookline; Jack K. Lennard, Framingham; Jay J. Schlickman, Lexington; Robert A. Weagant, Chelmsford, all of Mass.

[73] Assignee: Honeywell Inc., Minneapolis, Minn.

[22] Filed: Sept. 7, 1972

[21] Appl. No.: 287,194

Related U.S. Application Data

[63] Continuation-in-part of Ser. No. 855,918, Sept. 8, 1969, abandoned.

[52] U.S. Cl. .......... 250/211 R, 250/226, 317/235 N, 356/99, 350/316
[51] Int. Cl. .......... G01j 3/34
[58] Field of Search .......... 250/211 J, 211 R, 250/212, 226; 317/235 N; 350/316; 356/99, 100

[56] References Cited

UNITED STATES PATENTS

| | | | |
|---|---|---|---|
| 2,896,086 | 7/1959 | Wunderman | 250/211 |
| 2,949,498 | 8/1960 | Jackson | 250/212 X |
| 3,324,298 | 6/1967 | Waer | 250/211 |
| 3,191,045 | 6/1965 | Colman | 250/211 |
| 3,478,214 | 11/1969 | Dillman | 250/211 |

FOREIGN PATENTS OR APPLICATIONS

| | | | |
|---|---|---|---|
| 629,924 | 10/1961 | Canada | 250/226 |
| 1,043,662 | 4/1959 | Germany | 250/226 |

OTHER PUBLICATIONS

Marinace; IBM Technical Disclosure Bulletin; Vol. 11; No. 4; 9/68; p. 398.

*Primary Examiner*—Walter Stolwein
*Attorney*—Charles J. Ungemach et al.

[57] ABSTRACT

A new multi-layer semiconductor photo detector arrangement, and scientific instruments embodying the underlying novel principle.

14 Claims, 10 Drawing Figures

PATENTED SEP 25 1973 3,761,718

DETECTOR APPARATUS USING SEMICONDUCTOR LAMINAE

BRIEF SUMMARY OF THE INVENTION

This invention is a continuation in part of case Ser. No. 855,918, filed Sept. 8, 1969 now abandoned.

The invention relates to the field of supervisory apparatus, and more particularly to a new photodetector arrangement and new scientific instruments made possible thereby.

DESCRIPTION

Semiconductor materials are now obtainable in slabs of laminae having a longitudinal axis along which the peak wave length sensitivity varies substantially uniformly. The semiconductors comprise offset laminae each having a longitudinal axis along which the peak wavelength sensitivity varies substantially uniformly. Any number of semiconductor materials are suitable for use in this present invention as long as the laminae have varied peak wave length sensitivity. Semiconductor materials of a single substance, nominally termed pure semiconductors, are not capable of having varied wave length peak sensitivity since they are homogeneous compositions. However, when the semiconductors are composed of more than one components, it is possible to produce with varied peak wave lengths along a length or axis by varying a proportion of components along that length. With binary alloys and other materials which act like binary alloys, it is possible to produce lamina which have nearly straight line variation in peak wave length sensitivity from the pure first component through a mixture of both to pure second component. Mercury-cadmium-telluride is a preferred example of a binary alloy which has controlled variation of its peak wave length sensitivity along its length, with this sensitivity ranging from the lower value of mercury telluride through the binary mixture to a higher value of cadmium telluride. Like a number of semiconductor alloys, mercury-cadmium-telluride is ternary in its formula but may also be termed as a pseudobinary, actually formed from mercury telluride and cadmium telluride in such a manner so as to preserve the two components.

Actually, any two pure semiconductors may be combined to form a binary alloy useful in the present invention. Examples of these are: germanium, selenium, silicon, tin, tellurium, cadmium sulfide, zinc sulfide, cadmium selinide, cadmium telluride, gallium arsenide, indium arsenide, indium phosphide, magnesium stannide, lead sulfide, lead selenide, lead telluride, mercury telluride, lead tin telluride, aluminum antimonide, gallium antimonide, and indium antimonide. A semiconductor binary alloy formed from any two of the above pure semiconductors will produce a semiconductor having variations in peak wave length sensitivity along an axis.

Figure 1:
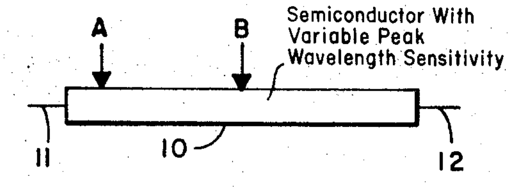
FIGS. 1, 2, and 3 are diagrams illustrating the background of the invention, FIGS. 4 and 6 to 10, inclusive, show modifications of the invention.
Figure 2:
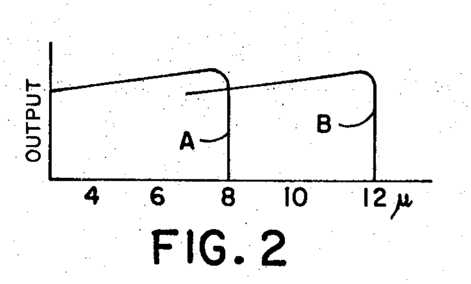

Thus, if lamina 10 in FIG. 1 is illuminated at point A with equal amounts of power over a range of wave lengths, the output on conductors 11 and 12 may vary with wave length as at A in FIG. 2, while if point B is similarly illuminated, the output may appear as at B in FIG. 2.

Figure 3:
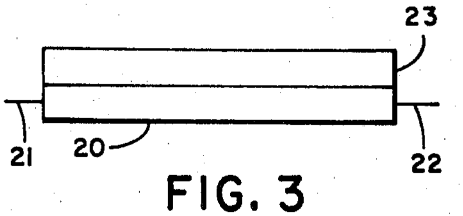

If such a lamina 20 is overlaid with another identical lamina 23, as shown in FIG. 3, the upper lamina acts as a filter for the lower lamina, and the latter gives no output on conductors 21 and 22 because all the photons capable of producing current in lamina 20 have been absorbed in lamina 23, even though no electrical output resulting therefrom is used.

Figure 5:
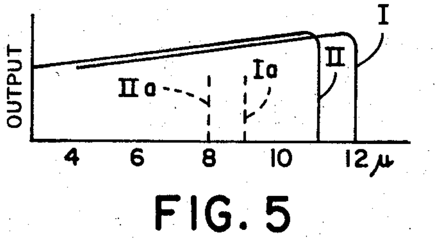
FIG. 5 is a curve illustrating the operative principle.
Figure 4:
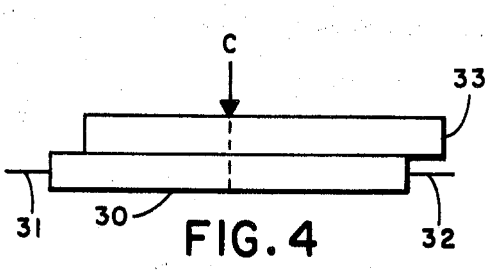

FIG. 4 shows the same elements as FIG. 3, but in this case lamina 33 is linearly displaced with respect to lamina 30. The sensitivity curve for the latter is shown at I in FIG. 5, but light at short wave lengths is absorbed in lamina 33 according to curve II and never reaches the lower lamina. Thus, only the light in the narrow wave length band between 11 and 12 microns in the illustrative example results in a useful output on conductors 31 and 32. By reducing the mechanical offset between the two semiconductor laminae the band width may be further reduced. Similarly as point C is moved along the material the area between curves I and II is displaced in wave length (see I*a* and II a) although the band width remains the same.

Figure 6:
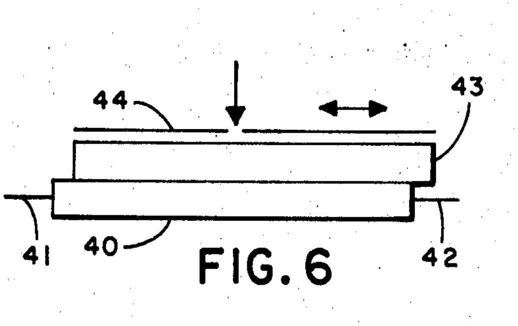

FIG. 6 shows a convenient expedient for changing the location of point C. A member 44 having a narrow slit extending thereacross is mounted for longitudinal movement adjacent to lamina 33. If light of a range of wave lengths is supplied through the slit, the output on conductors 41 and 42 is proportional to the energy of only a narrow band of wave lengths, the limits of which change as the slot is moved. This device is accordingly a scanning monochromator.

Figure 7:
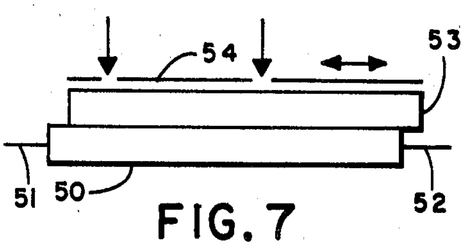

In FIG. 7 a mask 54 having a pair of slits with a predetermined spacing has been substituted for the movable slit. The instrument of this figure is a correlation spectrometer.

Figure 8:
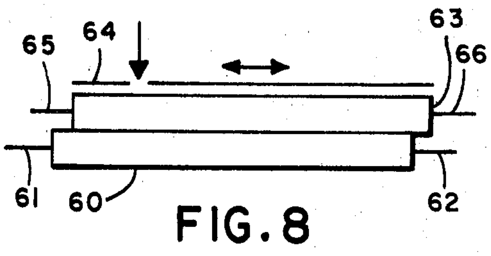

As suggested in FIG. 8 a movable slit can be used with two laminae offset according to FIG. 6, but with conductors for taking outputs from both laminae at 61, 62, and 65, 66. Then by comparing the outputs a wide range slope discriminator of "derivative spectrometer" results.

Figure 9:
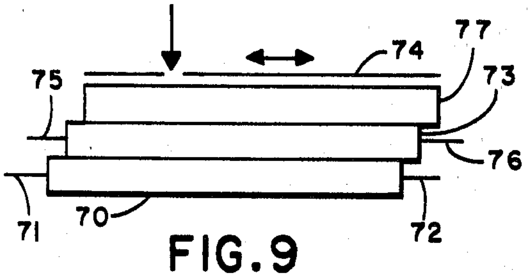

It must be pointed out that the principle of our invention is not limited to the use of only two laminae. FIG. 9 shows a structure having three laminae 70, 73, and 77, together with movable slit 74. With respect to element 73, element 70 is displaced to the left and element 77 is displaced to the right. Outputs are taken from both lamina 70 and lamina 73, and lamina 77 is again only an initial short wave cutoff filter. This gives a more effective derivative spectrometer than the structure of FIG. 7.

Figure 10:
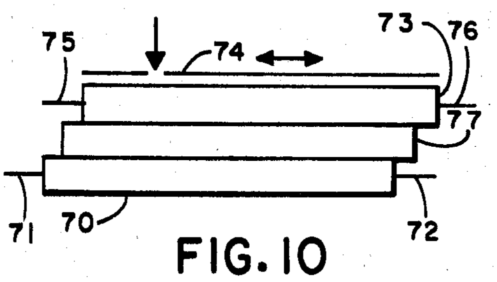

FIG. 10 shows a modification of the previous arrangement in which the middle lamina is made passive and outputs are taken from the upper and lower laminae to give a narrow band rejection filter.

The provision of additional laminae with further displacement and with different ones of the laminae active (that is, giving outputs) or passive, makes possible the performance of other functions such as single or dual band pass detection or rejection.

As has been stated any number of semiconductor materials having peak wave length sensitivity variations along their length may be employed in the present invention. Of these, mercury cadmium telluride is a preferred semiconductor material. Other binary alloys however are equally suitable as long as they are formed with the proper proportion of components so that variations in the relative proportions yield variations in the peak wave length sensitivity.

Numerous abstracts and advantages of our invention have been set forth in the foregoing description, together with details of the structure and function of the invention, and the novel features thereof are pointed out in the appended claims. The disclosure, however, is illustrative only, and we contemplate variations in detail, especially in matter of shape, size and arrangement of parts, within the principle of the invention.

We claim:

1. Semiconductor apparatus comprising, in combination:

a plurality of laminae of semiconductor material characterized by variation in peak light wave length sensitivity along their lengths;

means mounting said laminae face to face in lengthwise mutually offset relation for normal impingement of light thereon so that each lamina acts as a filter for any lamina further from the light depending upon the amount of offset; and means deriving an electrical output from at least one said laminae.

2. Apparatus according to claim 1 and means deriving an electrical output from the lamina furthest from the light.

3. Apparatus according to claim 1 and means deriving an electrical output from the lamina nearest the light.

4. Apparatus according to claim 1 in which there are two laminae.

5. Apparatus according to claim 1 in which the semiconductor material is a binary alloy.

6. Apparatus according to claim 5 wherein the binary alloy is mercury cadmium telluride.

7. Apparatus according to claim 1 in which there are several laminae together with means for taking electrical outputs from more than one of said laminae.

8. Apparatus according to claim 1 and slot means for admitting light to said device along at least one narrow transverse portion thereof.

9. Apparatus according to claim 8 in which said slot means is movable longitudinally with respect to the device.

10. Apparatus according to claim 8 together with means deriving an electrical output from at least one of said laminae.

11. Apparatus according to claim 8 together with means deriving electrical outputs from two of said laminae.

12. Apparatus according to claim 8 in which said slit means comprises a mask having a plurality of slits with a predetermined spacing therebetween.

13. A scanning monochromater comprising the apparatus of claim 8 and means directing light from a source of interest to said laminae through said slit means.

14. A correlation spectrometer comprising the apparatus of claim 12 and means directing light from a source of interest to said laminae through said mask.

* * * * *